(12) United States Patent
Rim

(10) Patent No.: US 7,329,459 B2
(45) Date of Patent: Feb. 12, 2008

(54) POLYMER-BASED REINFORCEMENT MATERIAL AND TIRE CORD COMPOSITIONS AND METHODS OF PRODUCTION THEREOF

(75) Inventor: Peter Bryan Rim, Midlothian, VA (US)

(73) Assignee: Performance Fibers, Inc., Richmond, VA (US)

( * ) Notice: Subject to any disclaimer, the term of this patent is extended or adjusted under 35 U.S.C. 154(b) by 307 days.

(21) Appl. No.: 10/384,046

(22) Filed: Mar. 7, 2003

(65) Prior Publication Data
US 2004/0173299 A1 Sep. 9, 2004

(51) Int. Cl.
*B32B 27/34* (2006.01)
*D02G 3/00* (2006.01)
*B60C 9/00* (2006.01)

(52) U.S. Cl. ............... 428/395; 428/364; 428/375; 428/392; 428/394; 152/527; 152/531; 152/526; 152/536

(58) Field of Classification Search ........ 428/364, 428/375, 392, 394, 395; 152/527, 531, 526, 152/536; 156/117, 123
See application file for complete search history.

(56) References Cited

U.S. PATENT DOCUMENTS

| | | | | |
|---|---|---|---|---|
| 3,595,953 | A | 7/1971 | Konishi et al. | 264/290 |
| 4,284,117 | A | 8/1981 | Poque et al. | 152/361 R |
| 4,724,881 | A * | 2/1988 | Poque et al. | 152/527 |
| 4,739,814 | A | 4/1988 | Berczi et al. | 152/527 |
| 5,118,558 | A * | 6/1992 | Mater et al. | 442/287 |
| 5,365,988 | A * | 11/1994 | Soderberg et al. | 152/527 |
| 5,795,417 | A * | 8/1998 | Damke et al. | 152/527 |
| 6,016,857 | A | 1/2000 | Roesgen et al. | 152/209.1 |
| 6,016,858 | A | 1/2000 | Roesgen et al. | 152/209.1 |
| 6,082,423 | A | 7/2000 | Roesgen et al. | 152/209.1 |
| 6,886,320 | B2 * | 5/2005 | Rowan | 57/296 |
| 2002/0088523 | A1 | 7/2002 | Miyazaki et al. | 152/537 |

FOREIGN PATENT DOCUMENTS

| | | |
|---|---|---|
| GB | 1184346 | 3/1970 |
| GB | 1190078 | 4/1970 |
| WO | WO 9925571 | 5/1999 |

OTHER PUBLICATIONS

Pending U.S. Appl. No. 10/342,533, filed Jan. 14, 2003, Huynh-Tran.

* cited by examiner

*Primary Examiner*—Bruce H. Hess
*Assistant Examiner*—Lawrence Ferguson
(74) *Attorney, Agent, or Firm*—Morgan, Lewis & Bockius LLP

(57) ABSTRACT

The subject matter herein is directed to a polymer-based cap ply reinforcement material that has a shrinkage component, wherein the reinforcement material is treated such that the shrinkage component increases at least about 10% over a reference shrinkage component of a reference polymer-based reinforcement material. The subject matter herein is further directed to a method of producing a product comprising a polymer-based cap ply reinforcement material, wherein the method includes: a) providing a reference polymer-based cap ply reinforcement material having a reference shrinkage component; b) providing a polymer-based cap ply reinforcement material having a shrinkage component; c) treating the polymer-based cap ply reinforcement material such that the shrinkage component increases at least about 10% over the reference shrinkage component of the reference polymer-based cap ply reinforcement material.

3 Claims, No Drawings

POLYMER-BASED REINFORCEMENT MATERIAL AND TIRE CORD COMPOSITIONS AND METHODS OF PRODUCTION THEREOF

FIELD OF THE INVENTION

The field of the invention is polymer-based reinforcement material and tire cord compositions and more specifically, the physical modification of polymer-based reinforced materials, tire cords, including polyester-based tire cords, and cap plies to enhance performance of the material and tire cords and the related compositions and items formed from the disclosed methods.

BACKGROUND

In evaluating the overall performance of a motor vehicle, the tire performance is generally one of the critical and contributing performance factors measured and evaluated through such tests as speed and endurance tests. Once evaluated, tire performance can be improved by breaking down and evaluating the individual components of the tire and how those individual components work together to contribute to tire performance and ultimately motor vehicle performance.

Tires generally comprise a composite of several layers of material, such as those layers found in a conventional steel-belted radial tire. In the conventional steel-belted radial tire, the layered material that makes up the tire comprises an inner layer of "tire fabric", a middle or outer layer of steel belts or steel cord belt plies, and in some cases an outer layer or layers of secondary tire fabric that is commonly referred to as a "cap ply" or "overlay" and generally comprises nylon or polyester cords.

In conventional tire fabric manufacturing processes, yarn is shipped to a conversion mill where it is subject to the following process: a) yarn is twisted into a greige cord (an unfinished cord), b) the greige cords are generally woven into a unidirectional fabric stabilized with fine denier "pick threads" in the weft direction, c) an aqueous dip (commonly known as a resorcinol-formaldehyde-latex (RFL) adhesive system) is applied to the greige cord, d) the dipped cord is dried, and e) the dried cord is subjected to a high energy treating step, often requiring relatively high temperatures (350-480° F.) for relatively long residence times (30-120 sec). The resulting cord is then shipped to a tire plant where it is formed (generally calendared or passed between heated steel rolls) into a cord reinforced rubber sheet which is ultimately built into tires as the underlying carcass or the cap plies that may or may not sandwich belts or belt material. For reference, typical tire "fabric" has at least 20-30 cords per inch.

In some tire embodiments, the steel belts may be either removed altogether or replaced and/or reinforced by a polymer-based belt material or other material that can meet and/or exceed the standard for the requirements of belt properties, such as a) not heat sensitive, b) relatively constant physical properties, c) inextensible and d) fatigue resistant. However, it has been generally determined that many of the replacement and/or reinforcing materials are either too cost prohibitive or too difficult to work with and therefore, steel continues to be the belt material of choice.

Several U.S. Patents discuss cap plies and their various embodiments, including U.S. Pat. Nos. 4,284,117; 4,739,814, 6,016,857; 6,082,423 and 6,016,858. Most of these patents describe changing the materials used to produce the cap plies or replacing the steel belts. None of these patents describe physically or mechanically modifying the cap plies to improve the properties of the plies once they are incorporated into a finished tire.

U.S. Patent Application Publication No. 2002/0088523 A1 published to Miyazaki et al. discloses a pneumatic tire that comprises an organic fiber cord. Although the organic cord disclosed in Miyazaki may or may not be stretched, a measure of cord stretch and modulus is much lower than the cords of the subject matter presented herein.

Therefore, there is still a need in the tire manufacturing industry for a product that may be used to form or produce a cap ply and/or a tire that can meet and/or exceed certain performance tests when incorporated into a finished tire, such as speed and endurance tests. There is also a need for this product to be cost efficient, relatively easy to manufacture and incorporated into standard or conventional tire manufacturing processes and safe to use in the finished tire and with the motor vehicle of choice.

SUMMARY OF THE SUBJECT MATTER

The subject matter herein is directed to a polymer-based cap ply reinforcement material that has a shrinkage component, wherein the reinforcement material is treated such that the shrinkage component increases at least about 10% over a reference shrinkage component of a reference polymer-based reinforcement material. Furthermore, the subject matter herein is directed to a polyester-based reinforcement material having a shrinkage component of at least about 3.5% free shrinkage.

In addition, the subject matter herein is directed to a method of producing a product comprising a polymer-based cap ply reinforcement material, wherein the method includes: a) providing a reference polymer-based cap ply reinforcement material having a reference shrinkage component; b) providing a polymer-based cap ply reinforcement material having a shrinkage component; c) treating the polymer-based reinforcement material such that the shrinkage component increases at least about 10% over the reference shrinkage component of the reference polymer-based reinforcement material.

DETAILED DESCRIPTION

The subject matter described herein provides methods for producing a product that comprises a polymer-based reinforcement material and/or a polyester-based reinforcement material that can be used in the production of a cap ply and/or incorporated into a finished tire as an underlying carcass material, if necessary.

According to the subject matter described herein, a polymer-based cap ply reinforcement material is provided that has a shrinkage component, wherein the reinforcement material is treated such that the shrinkage component increases at least about 10% over a reference shrinkage component of a reference polymer-based reinforcement material. In addition, a polymer-based and/or a polyester-based reinforcement material is provided that has a shrinkage component of at least about 3.5% free shrinkage.

At this point it should be understood that, unless otherwise indicated, all numbers expressing quantities of ingredients, constituents, interaction conditions and so forth used in the specification and claims are to be understood as being modified in all instances by the term "about". Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

A plurality of polymer-based fibers, which would normally be used to make tire fabric and related compositions and materials, may be used herein as a starting point for the production of the reinforcement material and/or reference reinforcement material. The polymer-based fibers generally comprise any long chain natural or synthetic polymer composed of at least about 80% by weight of an ester of a dihydric alcohol and terephthalic acid (PET) or naphthalene dicarboxyllic acid (PEN). For example, a suitable and contemplated polymer-based fiber and/or reinforcement material comprises polyester, polyester-based materials, nylon-based material and/or materials that include, in part, polyester compounds, nylon compounds and/or a combination thereof.

It is generally contemplated that the polymer-based cap ply reinforcement material (also known as the sample material) and the reference polymer-based cap ply reinforcement material (also known as the reference material) comprise the same base material before variations are made to the sample material, especially in view of the definition of the term "reference". As used herein, the term "reference" means a control, a standard and/or a generally excepted conventional product, fiber, material, cord, cap ply or tire. For example, a reference material would be the "control" or base with which the sample material or material is compared. The reference is a sample of identical constitution and prepared under the same conditions for which all experimental, processing, manufacturing, chemical and/or physical variations are omitted. In chemical terms, the "reference" is analogous to a "blank", in that all of the properties of the variation or sample material are measured and calculated against the reference as if the properties of the reference equaled, in effect, zero. Therefore, when comparing relative properties of a reference material and a sample material, it is important that both the reference material and the sample material begin with the same base material before variations are incorporated into the sample material.

It is contemplated that one of the processing, manufacturing and/or physical variations comprises modulation of the shrinkage component of the polymer-based reinforcement material. The shrinkage component may be measured by several different testing methods, such as by Free Shrinkage (non-restrained shrinkage). The shrinkage component or shrinkage component number is presented as a percentage. Each polymer-based reinforcement material comprises a shrinkage component, which identifies the degree of shrinkage that has been applied to the material. In some cases, the shrinkage component of a material may be greater than zero percent, meaning that the material is in its originally produced form and has not undergone any stretch or relax during treating to shrink or induce shrinkage in the material. It should be understood that a material in its natural "stretch" form will comprise some measurable shrinkage component.

In some contemplated embodiments, the reference polymer-based cap ply reinforcement material comprises a shrinkage component that is greater than about zero or zero percent and the difference between the shrinkage component of the polymer-based reinforcement material and the reference shrinkage component of the reference polymer-based reinforcement material is at least about 10%, meaning that there is at least about a 10% increase in the shrinkage component of the polymer-based reinforcement material. In other embodiments, there is at least about a 20% increase in the shrinkage component of the polymer-based reinforcement material relative to the reference shrinkage component of the reference polymer-based reinforcement material. In yet other embodiments, there is at least about a 25% increase in the shrinkage component of the polymer-based reinforcement material relative to the reference shrinkage component of the reference polymer-based reinforcement material. In even other embodiments, there is at least about a 35% increase in the shrinkage component of the polymer-based reinforcement material relative to the reference shrinkage component of the reference polymer-based reinforcement material.

In other contemplated embodiments, a polymer-based reinforcement material and/or a polyester-based reinforcement material will comprise a shrinkage component of at least about 3.5% free shrinkage. In yet other contemplated embodiments, the shrinkage component will be at least about 4% free shrinkage.

A method of forming a product comprising a polymer-based cap ply reinforcement material, such as those described herein, comprises: a) providing a reference polymer-based cap ply reinforcement material having a reference shrinkage component; b) providing a polymer-based cap ply reinforcement material having a shrinkage component; c) treating the polymer-based reinforcement material such that the shrinkage component increases at least about 10% over the reference shrinkage component of the reference polymer-based reinforcement material. In some embodiments, the polymer-based reinforcement material will be treated such that the shrinkage component increases by at least about 20%, at least about 25% or at least about 35% over the reference shrinkage component of the reference polymer-based reinforcement material.

In addition, a method of forming a product comprising a polyester-based reinforcement material, such as those described herein, comprises: a) providing a reference polyester-based reinforcement material having a reference shrinkage component; b) providing a polyester-based reinforcement material having a shrinkage component; c) treating the polyester-based reinforcement material such that the shrinkage component increases at least about 10% over the reference shrinkage component of the reference polyester-based reinforcement material. In some embodiments, the polyester-based reinforcement material will be treated such that the shrinkage component increases by at least about 20%, at least about 25% or at least about 35% over the reference shrinkage component of the reference polyester-based reinforcement material.

In yet another contemplated method of forming a product comprising a polymer-based cap ply reinforcement material and/or a polyester-based reinforcement material, such as those described herein, the method would comprise: a) providing a polymer-based cap ply reinforcement material and/or a polyester-based reinforcement material; and b) treating the polymer-based cap ply reinforcement material and/or the polyester-based reinforcement material such that it comprises a shrinkage component of at least about 3.5% free shrinkage. In some embodiments, the shrinkage component will be at least about 4% free shrinkage.

Polymer-based cap ply reinforcement materials comprising a shrinkage component, including reference polymer-based reinforcement materials, may be provided by any suitable method, including a) buying polymer-based reinforcement materials from a supplier or textile mill; b) preparing or producing the polymer-based reinforcement materials in house using chemicals provided by another source and/or c) preparing or producing the polymer-based reinforcement materials in house using chemicals also produced or provided in house or at the location. It is contemplated that polymer-based reinforcement materials are made of any suitable material, such as those materials already described herein.

The material may be modified by finishes or coatings applied during (a) the yarn making step (i.e., during spinning and/or drawing), (b) subsequent yarn handling (i.e., package formation, beaming, re-winding, etc.), (c) ply or cable twisting, and/or (d) cord coating operations prior to calendaring, extrusion, or even filament-winding. The finishes or coatings may be aqueous, non-aqueous solvent-based, or "neat"—meaning that there is no solvent or other molecule and/or compound present that must be removed during later processing. Aqueous emulsions may be applied anywhere in the process, but it is preferred to apply them during spinning and drawing where the applied heat will quickly drive-off the water or prior to a storage step where there is time for the water to evaporate. "Neat" coatings may be applied to the yarn or the resulting cord. It is preferred that these neat coatings are fluid at elevated temperature to facilitate uniform coating and then solidify upon cooling to facilitate handling and packaging.

Contemplated non-aqueous solvents include any suitable pure or mixture of organic molecules that are volatilized at a desired temperature and/or easily formed into an organic phase. The solvent may also comprise any suitable pure or mixture of polar and non-polar compounds. Some solvents include, but are not limited to, ketone-based solvents, such as acetone, methyl ethyl ketone and 2-propanol.

The step of treating the polymer-based cap ply reinforcement material or the polyester-based reinforcement material, both of which have a shrinkage component, such that the shrinkage component increases at least about 10%, at least about 20%, at least about 25% or at least about 35% over a reference shrinkage component of a reference polymer-based reinforcement material or the step of treating the polymer-based reinforcement material and/or the polyester-based reinforcement material such that either comprises a shrinkage component of at least about 3.5% or at least about 4% may comprise heating or heat-treating the polymer-based reinforcement material, chemically treating the polymer-based reinforcement material, mechanically or physically processing the polymer-based reinforcement material or any other suitable treating step that will increase the shrinkage component of the polymer-based reinforcement material over that of a reference shrinkage component. It is further contemplated that the treating step may comprise a combination of at least two different treating methods.

Once the polymer-based cap ply reinforcement material is treated such that the shrinkage component is increased by a predetermined amount over a reference shrinkage component or such that the shrinkage component has a measurable percentage of free shrinkage, the material may be processed or otherwise utilized to form at least one polymer-based fiber, at least one polymer-based cord, at least one polymer-based yarn, at least one polymer-based cap ply, and/or at least one tire.

It is contemplated that the polymer-based cap ply reinforcement material, once processed, may be coupled with an adhesive material in order to form an interface with the underlying material, such as the steel-belt component of the tire and/or the carcass of the tire. It is further contemplated that an adhesive material may not be necessary, especially if there is an additional treatment step when combining or coupling the polymer-based reinforcement material with the underlying material, such as heat treating steps or pressure treating steps. It is additionally contemplated that the polymer-based reinforcement material may be coupled with a suitable rubber composition or rubber compound, in order to improve the stability of the reinforcement material or to provide a suitable finished tire.

As used herein, the term "interface" means a couple or bond that forms the common boundary between two parts of matter or space, such as between two molecules, two backbones, a backbone and a network, two networks, etc. An interface may comprise a physical attachment of two parts of matter or components or a physical attraction between two parts of matter or components, including bond forces such as covalent and ionic bonding, and non-bond forces such as Van der Waals, electrostatic, coulombic, hydrogen bonding and/or magnetic attraction. Contemplated interfaces include those interfaces that are formed with bond forces, such as covalent bonds through crosslinking; however, it should be understood that any suitable adhesive attraction or attachment between the two parts of matter or components is preferred.

As used herein, the term "crosslinking" refers to a process in which at least two molecules, or two portions of a long molecule or at least one backbone, are joined together by a chemical and/or adhesive interaction. Such interactions may occur in many different ways including formation of a covalent bond, formation of hydrogen bonds, hydrophobic, hydrophilic, ionic or electrostatic interaction. Furthermore, molecular interaction may also be characterized by an at least temporary physical connection between a molecule and itself or between two or more molecules.

As used herein, the term "backbone" means a contiguous chain of atoms or moieties forming a polymeric strand that are covalently bonded such that removal of any of the atoms or moieties would result in interruption of the chain. As used herein, the term "network" means the structure that results from the interaction, whether that interaction is chemical or adhesive, of at least one backbone, such as that structure that would result from crosslinking one backbone with a second backbone, or one backbone with itself.

Rubber compositions or compounds utilized herein can be saturated, unsaturated or a combination thereof, as long as the rubber compositions and compounds are suitable for use in tire fabrics and related materials. In contemplated embodiments, the rubber compositions or compounds comprise at least some degree of unsaturation before its cured. Contemplated rubber compounds described herein are comprised of mixtures containing various natural and synthetic rubbers including but not limited to, polyisoprene, acrylonitrile-butadiene copolymers, polychloroprene, butyl rubber, ethylene-propylene-diene (EPDM) terpolymers, polybutadiene (which can be modified by hydroxyl groups, carboxylic acid groups and/or anhydride groups) and styrene-butadiene copolymers compounded with silica, sulfur, rubber curing initiators, accelerators, oils, antidegradants and other reinforcing fillers.

Rubber compounds or rubber compositions may be provided by any suitable method, including a) buying rubber compounds or rubber compositions from a supplier; b) preparing or producing the rubber compounds or rubber compositions in house using chemicals provided by another source and/or c) preparing or producing the rubber compositions or rubber compounds in house using chemicals also produced or provided in house or at the location. It is contemplated that the rubber compounds or rubber compositions are made of any suitable material, such as those materials already described herein. It is further contemplated that active rubber moieties may be present in the rubber compound or rubber composition in order to expedite or facilitate reaction of the rubber compound with another component of the tire.

Surface modification agents may also be coupled with the polymer-based cap ply reinforcement material, such as those described in US, Malaysian, related Taiwan and PCT applications (U.S. Ser. No. 10/342,533; Malaysian PI 20030153; and related PCT and Taiwan applications—serial numbers not yet known) related to U.S. Provisional Patent Application 60/349,996 filed on Jan. 17, 2002, which are all commonly owned and incorporated herein in their entirety.

EXAMPLES

The polymer-based reinforcement material construction, cord construction and related data, as described in the Examples, are for illustrative purposes only and should not, in any way, limit the scope of this invention.

Test Procedures

Free Shrinkage: Free shrinkage was determined using a Testrite™ instrument. The weight was 0.01 gram per nominal denier, the temperature was 177° C., and the time was 1 minute.

Tire Speed Endurance: The speed-endurance test was performed as follows: Tire load was 85% of maximum and inflation pressure was 32 PSI. The initial test speed was 210 km/hr. The tires were ramped from stationary to the initial test speed over a ten minute period and that speed was maintained for 30 minutes. Next the speed was immediately raised 10 km/hr and maintained for 30 minutes. This last step was repeated until the tires failed.

Treated Polyester Yarns for Examples 1 and 2

The following table summarizes representative properties of the treated polyester twisted yarn reinforcements, which were used to make the tires in Examples 1 and 2.

Example 1

Polyester at 37 EPI

This example compares tires made with treated polyester reinforcement cap plies to tires made with traditional nylon 6.6 reinforcement cap plies. All of the tires were built by spiral wrapping the cap ply, and the relative weight of cap ply material, calculated from end per inch and nominal denier values, was approximately 9% greater for the nylon tire.

In the case of the polyester cap plies the reinforcement was a 1000 denier yarn, twisted 5 turns per inch, and processed with typical adhesives during the reinforcement treating process. The nylon reinforcement was a 1260 denier yarn, processed with typical nylon adhesives during the reinforcement treating process. The polyester reinforcements were processed to two shrinkage levels of 3.4% and 4.4% during the treatment process by varying the stretch level. Processing for the nylon was typical for commercial production. Although shrinkage values for the nylon Example were not available, typical values are higher than those of the polyester Examples, since nylon is a less dimensionally stable fiber than polyester.

Steel belted radial tires were built from each of the 3 reinforcements. The construction of the tires was the same, with the exception of the different reinforcements, different ends per inch, and different lifts during tire production. The polyester cap ply tires were made with 37 ends per inch whereas the nylon 6.6 cap ply tires were made with 32 ends per inch. The polyester cap ply tires were made at low and standard lift levels, whereas the nylon tires were made at standard lift levels.

The speed endurance test was performed on 5 tires of each tire type. The average failure time for the "nylon 6.6" tires was 50.9 minutes. For the polyester tires made at standard lift (polyester 5 and 7 in Table 1), The average failure time for the "3.4% shrinkage polyester tires" was 63.5 minutes and the time for the "4.4% shrinkage polyester tires" was 105.8 minutes. Clearly the failure time increases with

| Sample ID | Denier | Load at Maximum (lbs) | % Strain at Maximum (%) | Tenacity (gms/den) | Initial Modulus (gms/den) | LASE @ 5% (lbs) | EASL @ 10 lb (%) | Toughness (gms/den) | EASL @ 15 lbs (%) | Shrinkage (%) |
|---|---|---|---|---|---|---|---|---|---|---|
| 2% Stretch | 990 | 16.2 | 11.6 | 7.4 | 101.6 | 9.7 | 5.2 | .55 | 8.6 | 3.3 |
| 2% Stretch | 1006 | 16.3 | 11.9 | 7.3 | 101.4 | 9.8 | 5.1 | .57 | 8.5 | 3.4 |
| 2% Stretch | 983 | 15.6 | 10.5 | 7.2 | 102.3 | 9.8 | 5.1 | .47 | 8.8 | 3.3 |
| 2% Stretch | 989 | 15.9 | 11.0 | 7.3 | 100.5 | 9.6 | 5.2 | .50 | 8.6 | 3.4 |
| 2% Stretch | 1002 | 15.8 | 10.5 | 7.2 | 100.0 | 9.9 | 5.1 | .47 | 8.6 | 3.5 |
| Average | 994 | 16.0 | 11.1 | 7.3 | 101.2 | 9.7 | 5.1 | .51 | 8.7 | 3.4 |
| 5% Stretch | 974 | 15.6 | 9.5 | 7.2 | 97.2 | 10.2 | 4.9 | .41 | 8.2 | 4.4 |
| 5% Stretch | 967 | 16.1 | 10.6 | 7.5 | 98.4 | 10.3 | 4.9 | .51 | 7.9 | 4.3 |
| 5% Stretch | 965 | 15.9 | 10.7 | 7.5 | 100.5 | 10.5 | 4.8 | .52 | 8.2 | 4.4 |
| 5% Stretch | 983 | 16.1 | 11.2 | 7.5 | 97.3 | 10.7 | 4.7 | .55 | 8.0 | 4.5 |
| 5% Stretch | 968 | 15.9 | 10.7 | 7.4 | 96.4 | 10.6 | 4.7 | .51 | 8.2 | 4.4 |
| Average | 971 | 15.9 | 10.5 | 7.4 | 98.0 | 10.4 | 4.8 | .50 | 8.1 | 4.4 |

Although in this case the polyester was polyethylene terephthalate, it is envisioned that other high tenacity and high modulus reinforcements will provide advantages as well. It is also recognized that if the twist of the reinforcement is increased, a natural decrease in certain properties like modulus and tenacity will occur.

increasing polyester reinforcement shrinkage. Also, the same trend is observed for the low lift tires (polyester 6 vs. polyester 8 in Table 1).

Table 1 below shows the actual data collected from this set of experiments. EPI stands for "ends per inch" which relates to the number of cord ends in each inch of material.

| DENIER | CORD | STRETCH (%) | SHRINKAGE (%) | EPI | LIFT | FAILURE TIME (MIN) |
|---|---|---|---|---|---|---|
| 1260/1 | Nylon | STD | | 32 | STD | 45 |
| | | | | | | 43 |
| | | | | | | 40.25 |
| | | | | | | 40.16 |
| | | | | | | 86 |
| AVERAGE | | | | | | 50.9 |
| 1000/1 | Polyester 1 | 2 | 3.4 | 29 | STD | 74 |
| | | | | | | 70 |
| | | | | | | 45 |
| | | | | | | 51 |
| | | | | | | 40.25 |
| AVERAGE | | | | | | 56.1 |
| 1000/1 | Polyester 2 | 2 | 3.4 | 29 | LOW | 78 |
| | | | | | | 62 |
| | | | | | | 65 |
| | | | | | | 70 |
| | | | | | | 88 |
| AVERAGE | | | | | | 72.6 |
| 1000/1 | Polyester 3 | 5 | 4.4 | 29 | STD | 122 |
| | | | | | | 108 |
| | | | | | | 134 |
| | | | | | | 55 |
| | | | | | | 95 |
| AVERAGE | | | | | | 102.8 |
| 1000/1 | Polyester 4 | 5 | 4.4 | 29 | LOW | 63 |
| | | | | | | 73 |
| | | | | | | 110 |
| | | | | | | 53 |
| | | | | | | 81 |
| AVERAGE | | | | | | 76.0 |
| 1000/1 | Polyester 5 | 2 | 3.4 | 37 | STD | 58 |
| | | | | | | 63 |
| | | | | | | 75 |
| | | | | | | 47 |
| | | | | | | 74.5 |
| AVERAGE | | | | | | 63.5 |
| 1000/1 | Polyester 6 | 2 | 3.4 | 37 | LOW | 80 |
| | | | | | | 85 |
| | | | | | | 66 |
| | | | | | | 66 |
| | | | | | | 90 |
| AVERAGE | | | | | | 77.4 |
| 1000/1 | Polyester 7 | 5 | 4.4 | 37 | STD | 130 |
| | | | | | | 113 |
| | | | | | | 93 |
| | | | | | | 110 |
| | | | | | | 83 |
| AVERAGE | | | | | | 105.8 |
| 1000/1 | Polyester 8 | 5 | 4.4 | 37 | LOW | 76 |
| | | | | | | 90 |
| | | | | | | 83 |
| | | | | | | 82 |
| | | | | | | 103 |
| AVERAGE | | | | | | 86.8 |

Example 2

Polyester at 29 EPI

As in Example 1, this Example compares tires made with treated polyester reinforcement cap plies to tires made with traditional nylon 6.6 reinforcement cap plies. All of the parameters in this Example are the same as in Example 1, except for the ends per inch of the polyester cap ply reinforcement. In this case the ends per inch of the polyester tires is 29. Therefore, the relative weight of cap ply material, calculated from end per inch and nominal denier values, was approximately 40% greater for the "nylon" tire. Compared to the "polyester" tires in Example 1, the "polyester" tires of this Example contain approximately 22% less reinforcement.

The speed endurance test was performed on 5 tires of each tire type. The average failure time for the "nylon 6.6" tires was 50.9 minutes. For the polyester tires made at the standard lift (polyester 1 and polyester 3 in Table 1), the average failure time for the "3.4% shrinkage polyester tires" was 56.1 minutes, and the average failure time for the "4.4% shrinkage polyester tires" was 102.8 minutes. As in Example 1, clearly the failure time increases with increasing polyester reinforcement shrinkage. Also, the same trend is observed for the low lift tires (polyester 2 vs. polyester 4 in Table 1).

The importance of this invention becomes even greater when considering that the excellent behavior of the "polyester" tires vs. the "nylon" tires has occurred even though there is approximately 40% more cap ply reinforcement in the "nylon tire". It might be argued that because the modulus of polyester reinforcements is understood to be greater than nylon reinforcements, this is the mechanism of the improved behavior. For example, high modulus reinforcements like aramid fibers are understood to have excellent behavior when used as cap ply reinforcements. Although this may be true to a certain extent, comparison of the "polyester" tires of Example 1 with those of Example 2 clearly shows that shrinkage is the critical factor in determining the tire performance. For example, for the standard lift case, the failure times for the "3.4% shrinkage tires" are 63.5 minutes and 56.1 minutes, whereas the failure times for the "4.4% shrinkage tires" are 105.8 minutes and 102.8 minutes.

Thus, specific embodiments and applications of the production of tire cords and fabrics, methods and uses thereof have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

I claim:

1. A product, comprising:
    a modified high modulus low shrink polyester-based cap ply reinforcement material, said cap ply reinforcement material located within a tire, and said material having:
    a shrinkage component of 3.3% to 4.5% free shrinkage at a simulated tire cure temperature of 177° C.;
    a stretch component from 1.5% to 6%; and
    an EASL of less than 5.5% measured at a ((nominal reinforcement denier) divided by 100) pounds.

2. The product of claim 1, wherein the shrinkage component is lese 4.4% free shrinkage.

3. The product of claim 1, where said polyester-based cap ply reinforcement material is comprised of multifilament fibers.

* * * * *